(12) United States Patent
Hachiya

(10) Patent No.: US 7,511,929 B2
(45) Date of Patent: Mar. 31, 2009

(54) SWITCHING POWER SUPPLY AND SEMICONDUCTOR DEVICE USED THEREFOR

(75) Inventor: Yoshiaki Hachiya, Shiga (JP)

(73) Assignee: Panasonic Corporation, Osaka (JP)

( * ) Notice: Subject to any disclaimer, the term of this patent is extended or adjusted under 35 U.S.C. 154(b) by 350 days.

(21) Appl. No.: 11/560,558

(22) Filed: Nov. 16, 2006

(65) Prior Publication Data

US 2007/0121258 A1     May 31, 2007

(30) Foreign Application Priority Data

Nov. 28, 2005    (JP)   ............... 2005-342422

(51) Int. Cl.
    *H02H 3/22*      (2006.01)
(52) U.S. Cl. .................... 361/18; 361/111
(58) Field of Classification Search .................... 361/18, 361/91.1, 111; 363/16, 21, 21.12
See application file for complete search history.

(56) References Cited

U.S. PATENT DOCUMENTS 5,502,370 A * 3/1996 Hall et al. .................... 323/284
6,445,598 B1 * 9/2002 Yamada .................... 363/21.12

FOREIGN PATENT DOCUMENTS

JP     3480462     10/2003

* cited by examiner

*Primary Examiner*—Danny Nguyen
(74) *Attorney, Agent, or Firm*—Hamre, Schumann, Mueller & Larson, P.C.

(57) ABSTRACT

An operating voltage of a control circuit controlling ON/OFF of a switching element of a power supply is supplied from a connection node between a primary winding of a transformer and the switching element. The control circuit includes: an output voltage detection circuit that obtains, from a voltage output from the wave-shaping circuit, a feedback voltage in proportion to a voltage output from the rectifier/smoothing circuit and generates a signal for PWM control of the switching element; and a bottom detection circuit that detects, from the voltage output from the wave-shaping circuit, a bottom level of a ringing voltage. The control circuit switches the switching element from OFF to ON in accordance with a signal output from an oscillator internal to the control circuit or a signal output from the bottom detection circuit.

11 Claims, 13 Drawing Sheets

SWITCHING POWER SUPPLY AND SEMICONDUCTOR DEVICE USED THEREFOR

BACKGROUND OF THE INVENTION

1. Field of the Invention

The present invention relates to a switching power supply and a semiconductor device used therefor. More particularly, the present invention relates to a novel control system that can reduce the size as well as noise of a switching power supply.

2. Description of Related Art

In general, a switching power supply is provided with a switching transformer, a switching element connected in series with a primary winding of the switching transformer; a control circuit that controls ON/OFF of the switching element; a rectifier/smoothing circuit connected with a secondary winding of the switching transformer; and an output voltage detection circuit that feeds a detection voltage, changing in accordance with an output voltage of the rectifier/smoothing circuit, back to the control circuit (see JP 3480462B, for example).

FIG. 1 is a circuit diagram showing an exemplary configuration of a conventional switching power supply. This switching power supply is provided with a switching transformer 101 having a primary winding 101a, a secondary winding 101b and an auxiliary winding 101c. A switching element 102 is connected in series with the primary winding 101a, and a direct current (DC) voltage Vin is applied to the primary winding 101a and the switching element 102. The switching element 102 is subjected to the ON/OFF control (PWM control) by a control circuit 103, thus conveying electric power from the primary winding 101a to the secondary winding 101b of the switching transformer 101.

A voltage generated at the secondary winding 101b of the switching transformer 101 is rectified and smoothed by a rectifier/smoothing circuit 104 composed of a diode 104a and a capacitor 104b into an output DC voltage, which is fed to a load 105. This output DC voltage is detected by an output DC voltage detection circuit 106, and the detected voltage is fed back to the control circuit 103. The thus detected and fed-back voltage is then given to an ON duration control circuit 103a of the control circuit 103, and an output thereof is given to a pulse control circuit 103b. An output of the pulse control circuit 103b is given to a drive circuit 103c, and an output of the drive circuit 103c serves as a control signal (gate signal) of the switching element 102.

A voltage generated at the auxiliary winding 101c of the switching transformer 101 is rectified and smoothed by an output smoothing circuit 107 composed of a diode 107a and a capacitor 107b, which then is fed to the control circuit 103 as an operating voltage Vcc. Incidentally, at the time of starting prior to the ON/OFF control by the switching transformer 101, the operating voltage Vcc is fed from the DC voltage Vin through a resistor 108.

The voltage generated at the auxiliary winding 101c further is input to a ringing generation circuit 109 composed of a diode 109a, a resistor 109b, a capacitor 109c and a resistor 109d, and an output of the ringing generation circuit 109 is input to a comparator circuit 103d of the control circuit 103. A comparator CMP of the comparator circuit 103d makes a comparison of the input voltage with a reference voltage Vref, and an output of the comparator is given to the drive circuit 103c by way of a bottom counter circuit 103e and a delay circuit 103f. The ringing generation circuit 109, the comparator 103d, the bottom counter 103e and the delay circuit 103f are configured to generate a delay signal based on the number of the ringing occurring at the transformer during an OFF period of the switching element and makes the drive circuit 103c to delay an ON timing of the switching element in accordance with this delay signal. As the load changes from a heavy one to a light one, the number of the ringing increases. Thus, in accordance with the thus increasing number of ringing, the timing to turn ON the switching element can be delayed so as to increase an oscillation period of the switching element. In this way, as the load becomes lighter, the switching frequency can be made lower, thus obtaining the effect of decreasing a switching loss.

In the case where the primary side and the secondary side of the switching transformer have to be separated electrically, a photocoupler may be used in the output DC voltage detection circuit 106 to convey a fed-back signal to the control circuit 103.

The above-stated conventional switching power supply requires an output voltage detection circuit that is connected with the secondary side in order to detect an output voltage and feed back the same to a control circuit, which makes it difficult to downsize a switching power supply. Especially when the primary side and the secondary side are to be separated electrically using a photocoupler, it is difficult to downsize the switching power supply.

Furthermore, by virtue of the functions of the ringing generation circuit 109, the comparator circuit 103d, the bottom counter circuit 103e and the delay circuit 103f, the above-stated effect of suppressing a switching loss for a light load can be obtained. However, no countermeasures have been taken for reducing a switching noise.

Moreover, according to the conventional switching power supply, as a state of the load on the output side changes, the operating frequency of the switching element will change significantly. To cope with this, the size of the switching transformer 101 will increase, which makes it difficult to downsize a switching power supply.

SUMMARY OF THE INVENTION

Therefore, in order to cope with the above-stated conventional problems, it is an object of the present invention to provide a switching power supply capable of reducing the size as well as the noise of the switching power supply.

In order to cope with the above-stated problems, a switching power supply of the present invention includes: a switching transformer including a primary winding, a secondary winding and an auxiliary winding; a switching element connected in series with the primary winding of the switching transformer; a rectifier/smoothing circuit connected with the secondary winding of the switching transformer; a wave-shaping circuit connected with the auxiliary winding of the switching transformer; and a control circuit that controls ON/OFF of the switching element. The control circuit includes: an output voltage detection circuit that generates, from a feedback voltage output from the wave-shaping circuit, a signal for PWM control of the switching element; and a bottom detection circuit that detects, from the feedback voltage, a bottom level of a ringing voltage during a duration of a time when a current does not flow through the secondary winding of the switching transformer. The control circuit switches the switching element from OFF to ON in accordance with a signal output from an oscillator internal to the control circuit or a signal output from the bottom detection circuit.

According to the switching power supply of the present invention, a detection voltage in proportion to a voltage output from the rectifier/smoothing circuit on the secondary side is obtained from a feedback voltage output from the wave-shaping circuit connected with the auxiliary winding. Therefore, as compared with the conventional configuration where an output voltage detection circuit is connected on the secondary winding side of the switching transformer, the configuration of the circuit can be simplified and the power supply can be downsized. Especially, there is no need to provide a photocoupler for separating the secondary side from the primary side electrically. Furthermore, the function of the bottom detection circuit allows the detection of a bottom of a ringing voltage from a signal output from the wave-shaping circuit so as to turn ON the switching element, and therefore an electric power loss occurring at the turn-ON of the switching element can be suppressed (a bottom-on effect), thus realizing a high-efficiency switching power supply. Moreover, since a period of a signal that turns ON the switching element in accordance with a signal output from this bottom detection circuit varies slightly for each ON/OFF operation of the switching element, the operating frequency of the switching element can have a predetermined width with reference to a frequency of the oscillator, thus dispersing peaks of the electric power waveform and decreasing the value thereof (a jitter effect). Thereby, the size of the power supply as well as the noise thereof can be reduced at the same time.

In a preferred embodiment of the switching power supply of the present invention, an operating voltage of the control circuit is supplied from a connection node between one terminal of the primary winding of the switching transformer and the switching element or from the other terminal of the primary winding. Thereby, there is no need to supply an operating voltage of the control circuit separately, and therefore the switching power supply can be downsized.

In a preferred embodiment of the switching power supply of the present invention, the control circuit further includes: an error amplifier that amplifies a signal output from the output voltage detection circuit; and an overcurrent detection circuit to which an output from the error amplifier is fed. With this configuration, PWM control that changes a peak value of a current flowing through the switching element can be conducted precisely.

In another preferred embodiment of the switching power supply of the present invention, the control circuit further includes a blocking oscillation control circuit that stops or suspends an ON/OFF operation of the switching element if an output signal level of the error amplifier is a predetermined value or lower. Since the control circuit performs the blocking oscillation control in addition to the PWM control for the ON/OFF control of the switching element, stand-by power consumption can be reduced significantly.

In still another preferred embodiment of the switching power supply of the present invention, the control circuit further includes a ringing-off detection circuit that detects a state of ringing from a voltage output from the bottom detection circuit. When it is detected that ringing disappears or an amplitude of the ringing is a predetermined level or lower, the control circuit resumes ON/OFF control of the switching element. With this configuration, since an output voltage can be detected in a blocking oscillation control state, it is possible to address an abrupt change of a load state.

In a further preferred embodiment of the switching power supply of the present invention, an oscillation frequency of the oscillator internal to the control circuit has a predetermined width with a fixed frequency as a center. Thereby, noise can be reduced more.

In a still further preferred embodiment of the switching power supply of the present invention, the control circuit further includes an overvoltage detection circuit that detects when the operating voltage is higher than a predetermined voltage. With this configuration, the overvoltage detection circuit detects the situation where the operating voltage, controlled to be a constant voltage by a regulator internal to the control circuit, is increased forcibly by external power supply, and stops or suspends the switching operation of the switching element by the control circuit. As a result, the safety of the switching power supply can be enhanced.

In another preferred embodiment of the switching power supply of the present invention, the control circuit further includes an overheat protection circuit. Thereby, when the switching element generates heat abnormally, the switching power supply can be protected.

In another preferred embodiment of the switching power supply of the present invention, the wave-shaping circuit includes a Schottky barrier diode. Since a Schottky barrier diode with a short reverse recovery time is used, great fluctuations of the output signal of the wave-shaping circuit toward the negative side can be avoided and the safety of the switching power supply can be enhanced.

Still another preferred embodiment of the switching power supply of the present invention further includes an auxiliary winding voltage rectifier/smoothing circuit connected with the auxiliary winding. Electric power is supplied to the control circuit from the auxiliary winding voltage rectifier/smoothing circuit. Thereby, power consumption can be reduced more.

A semiconductor device of the present invention is used for the above-stated switching power supply. In this semiconductor device, the switching element and the control circuit may be integrated on a single substrate or may be incorporated into a single package. Such a semiconductor device allows a switching power supply to be downsized.

These and other advantages of the present invention will become apparent to those skilled in the art upon reading and understanding the following detailed description with reference to the accompanying figures.

DETAILED DESCRIPTION OF THE INVENTION

The following describes embodiments of the present invention, with reference to the drawings.

EMBODIMENT 1

Figure 1:
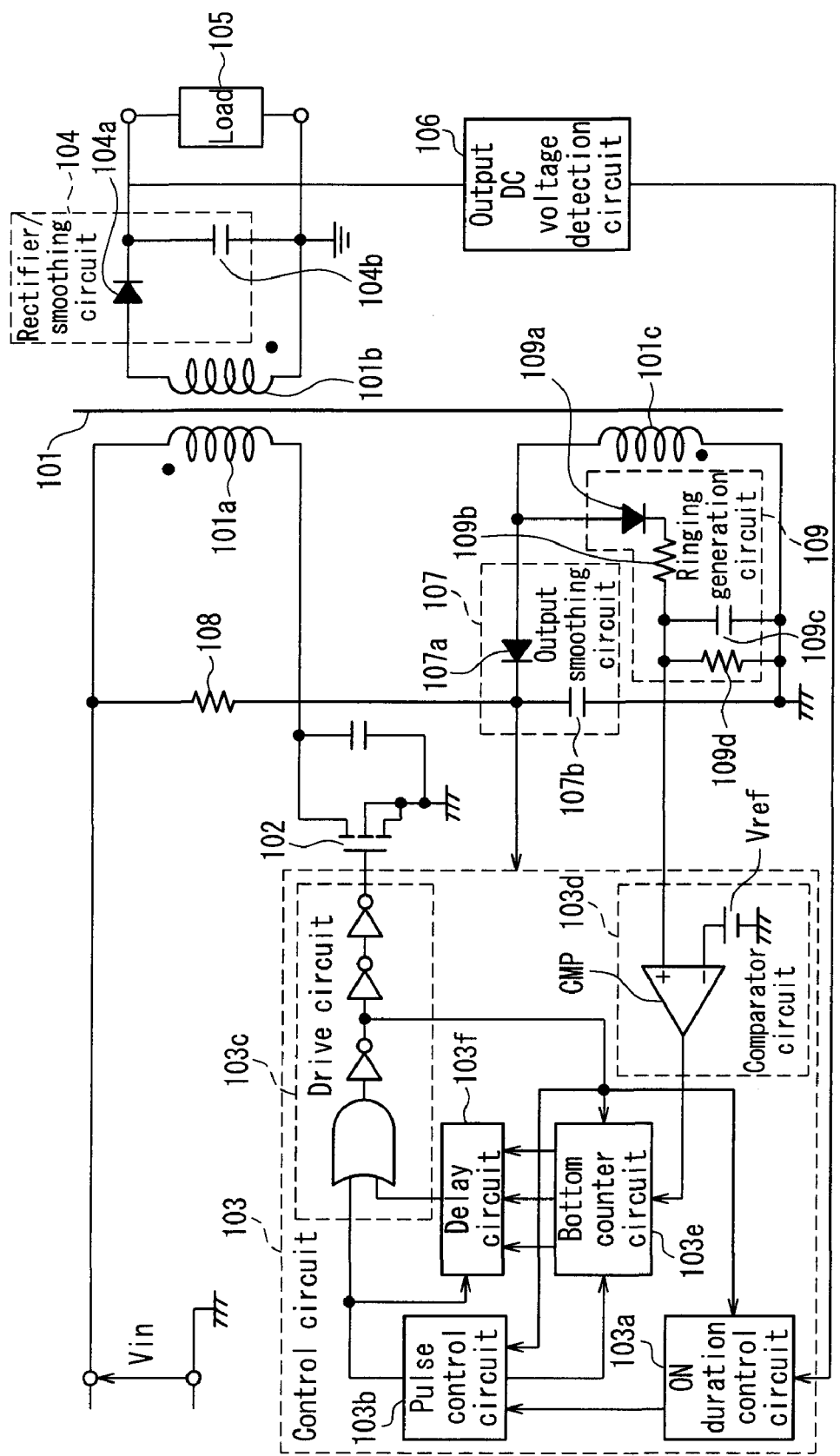
FIG. 1 is a circuit diagram showing an exemplary configuration of a conventional switching power supply.
Figure 2:
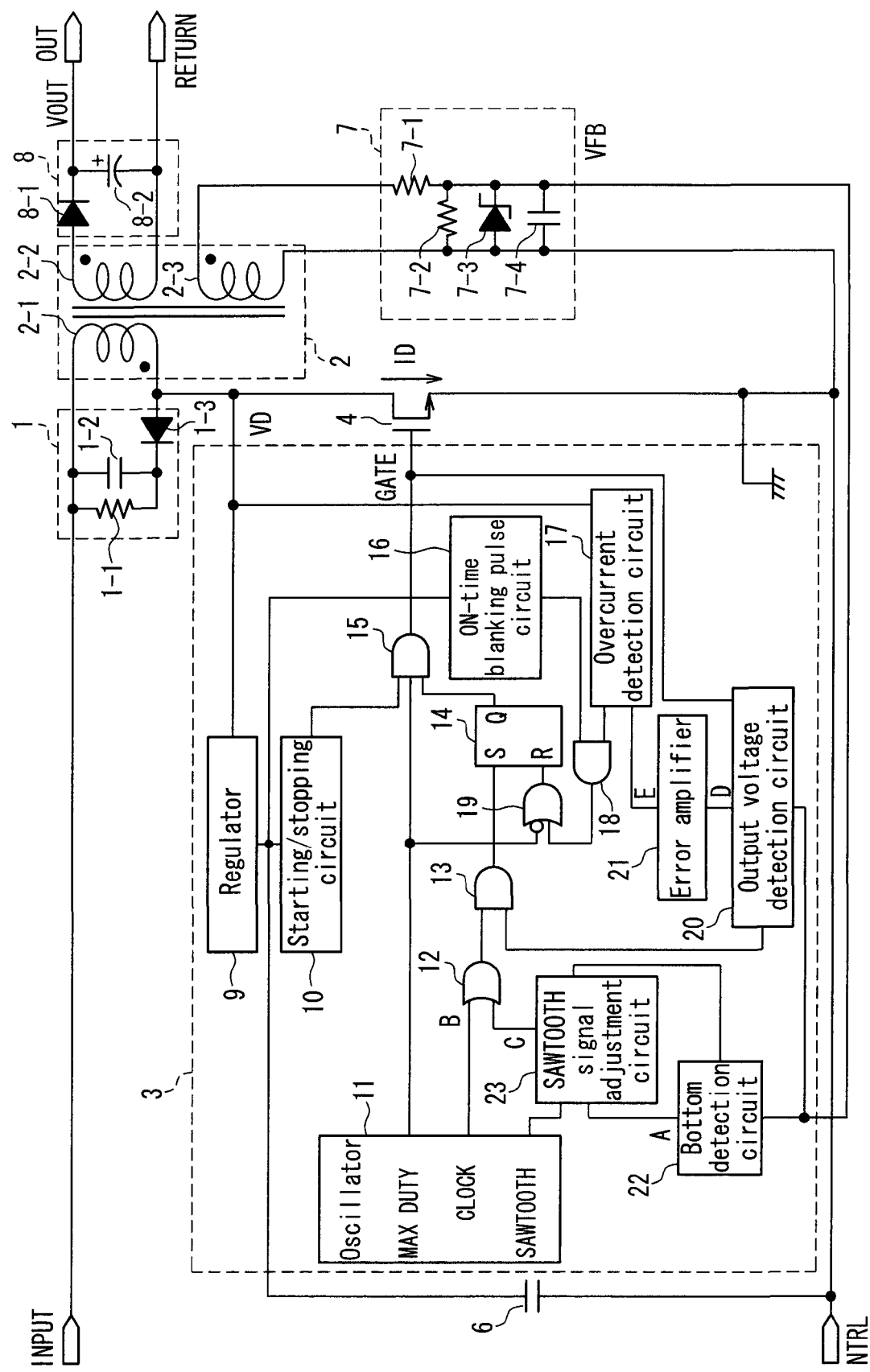
FIG. 2 is a circuit diagram of a switching power supply according to Embodiment 1 of the present invention.

FIG. 2 is a circuit diagram of a switching power supply according to Embodiment 1 of the present invention. This switching power supply is provided with a switching transformer 2, a switching element 4 connected in series with a primary winding 2-1 of the switching transformer 2, a control circuit 3 that controls ON/OFF of the switching element 4, a rectifier/smoothing circuit 8 connected with one terminal of a secondary winding 2-2 of the switching transformer 2, a wave-shaping circuit 7 connected with an auxiliary winding 2-3 of the switching transformer 2 and the like. The control circuit 3 and the switching element 4 may be composed of individual semiconductor devices, or may be composed of a single semiconductor device.

Figure 3:
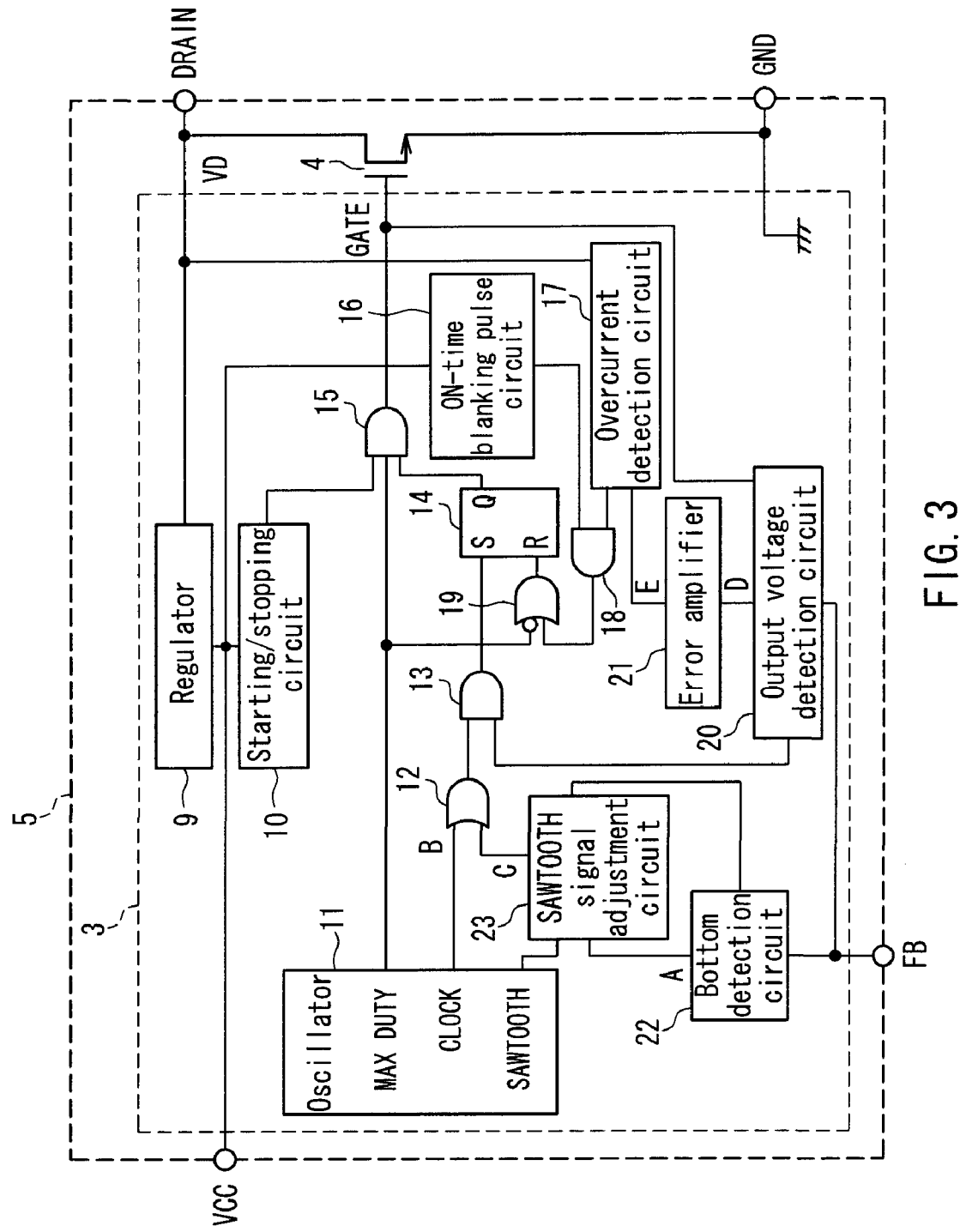
FIG. 3 is a circuit diagram of a semiconductor device used for the switching power supply according to Embodiment 1 of the present invention.

FIG. 3 is a circuit diagram of a semiconductor device used for the switching power supply according to Embodiment 1 of the present invention. This semiconductor device 5 includes a single package with the control circuit 3 and the switching element 4 incorporated therein, and has four terminals VCC, GND, DRAIN and FB. The VCC terminal is connected with an output of a regulator 9 internal to the control circuit 3, which is for connecting an external capacity between the regulator 9 and the GND terminal. The GND terminal is a terminal for connection with a ground level, and is connected with a NTRL terminal of FIG. 2. The DRAIN terminal is connected with a connection node between the primary winding 2-1 of the switching transformer 2 and the switching element 4, i.e., a drain of the switching element 4. The FB terminal is for feeding an output voltage of the wave-shaping circuit 7 to the control circuit 3 as a feedback signal.

In FIG. 2, a DC voltage (e.g., a voltage obtained by rectifying an AC power supply voltage and smoothing it) is supplied between an INPUT terminal and the NTRL terminal, i.e., at both ends of the primary winding 2-1 of the switching transformer 2 and the switching element 4 that are connected in series. A voltage at a connection node between the primary winding 2-1 of the switching transformer 2 and the switching element 4 (hereinafter called a drain voltage) is stabilized by the regulator 9 internal to the control circuit 3. An output voltage of the regulator 9 serves as an operating voltage of the control circuit 3. An external capacitor 6 is connected between an output terminal of the regulator 9 (VCC terminal of FIG. 3) and the NTRL terminal (GND terminal of FIG. 3).

Immediately after a current voltage is applied between the INPUT terminal and the NTRL terminal, the operating voltage VCC increases gradually in accordance with an inductance of the primary winding 2-1 of the switching transformer 2 and a capacitance of the capacitor 6. When the operating voltage VCC reaches a predetermined value, an output of a starting/stopping circuit 10 in the control circuit 3, i.e., one input of a three-input AND circuit 15 is reversed from a L level to a H level. As a result, in accordance with a MAXDUTY output signal of an oscillator 11 and an output signal of a flip-flop circuit 14 that are the other inputs of the three-input AND circuit 15, a gate signal GATE to the switching element 4 is output from the three-input AND circuit 15 so as to start ON/OFF control of the switching element 4. Note here that the switching element 4 is shifted from an ON state to an OFF state (turn OFF) in such a manner that a current flowing through the switching element 4 is detected by an overcurrent detection circuit 17 with reference to an output signal E of an error amplifier 21 so as to control a peak current value flowing through the switching element 4. In this way, according to the present invention, a PWM control in a current mode is performed.

When such ON/OFF control of the switching element 4 is started, electric power is conveyed from the primary winding 2-1 to the secondary winding 2-2 and the auxiliary winding 2-3 of the switching transformer 2. A voltage generated at the secondary winding 2-2 of the switching transformer 2 is rectified by a diode 8-1 of the rectifier/smoothing circuit 8 and smoothed by a capacitor 8-2 of the same to be an output voltage VOUT. This output voltage VOUT is output as a voltage between an OUT terminal and a RETURN terminal.

A spike voltage absorption circuit 1 is connected with the primary winding 2-1 of the switching transformer 2, where the spike voltage absorption circuit 1 is composed of a diode 1-3 that is connected with a resistor 1-1 and a capacitor 1-2 connected in parallel. This spike voltage absorption circuit 1 functions to absorb a spike voltage generated across the primary winding 2-1 when the switching element 4 turns OFF from ON.

The wave-shaping circuit 7 connected with the auxiliary winding 2-3 of the switching transformer 2 includes resistors 7-1 and 7-2 for voltage division, a Schottky barrier diode 7-3 for clamping the divided voltages and a capacitor 7-4. A Schottky barrier diode with a short reverse recovery time is used as the clamping diode, thus avoiding fluctuations of the output signal of the wave-shaping circuit greatly toward the negative side and enhancing the safety of the switching power supply. The output voltage signal VFB of the wave-shaping circuit 7 is fed back to the control circuit 3, which is then given to a bottom detection circuit 22 and an output voltage detection circuit 20 included in the control circuit 3.

An output voltage signal A of the bottom detection circuit 22 is fed to a SAWTOOTH signal adjustment circuit 23, and an output signal of the output voltage detection circuit 20 is fed to an AND circuit 13 and the error amplifier 21. The AND circuit 13 generates an AND signal of an output signal of an OR circuit 12 and an output signal of the output voltage detection circuit 20, which then serves as a set input of the flip-flop circuit 14. When the drain voltage VD is input to the overcurrent detection circuit 17, the overcurrent detection circuit 17 feeds an overcurrent detection output to an AND circuit 18 as one input based on the drain voltage VD and an output signal E of the error amplifier 21. An output of an ON-time blanking pulse circuit 16 is fed to the other input of the AND circuit 18, and an output of the AND circuit 18 serves as one input of an OR circuit 19. The other input (inverting input) of the OR circuit 19 is connected with the MAXDUTY output signal of the oscillator 11, and an output of the OR circuit 19 serves as a reset input of the flip-flop circuit 14. An output of the flip-flop circuit 14 serves as one input of the three-input AND circuit 15 and an output of the three-input AND circuit 15 serves as a gate signal of the switching element 4.

Figure 4:
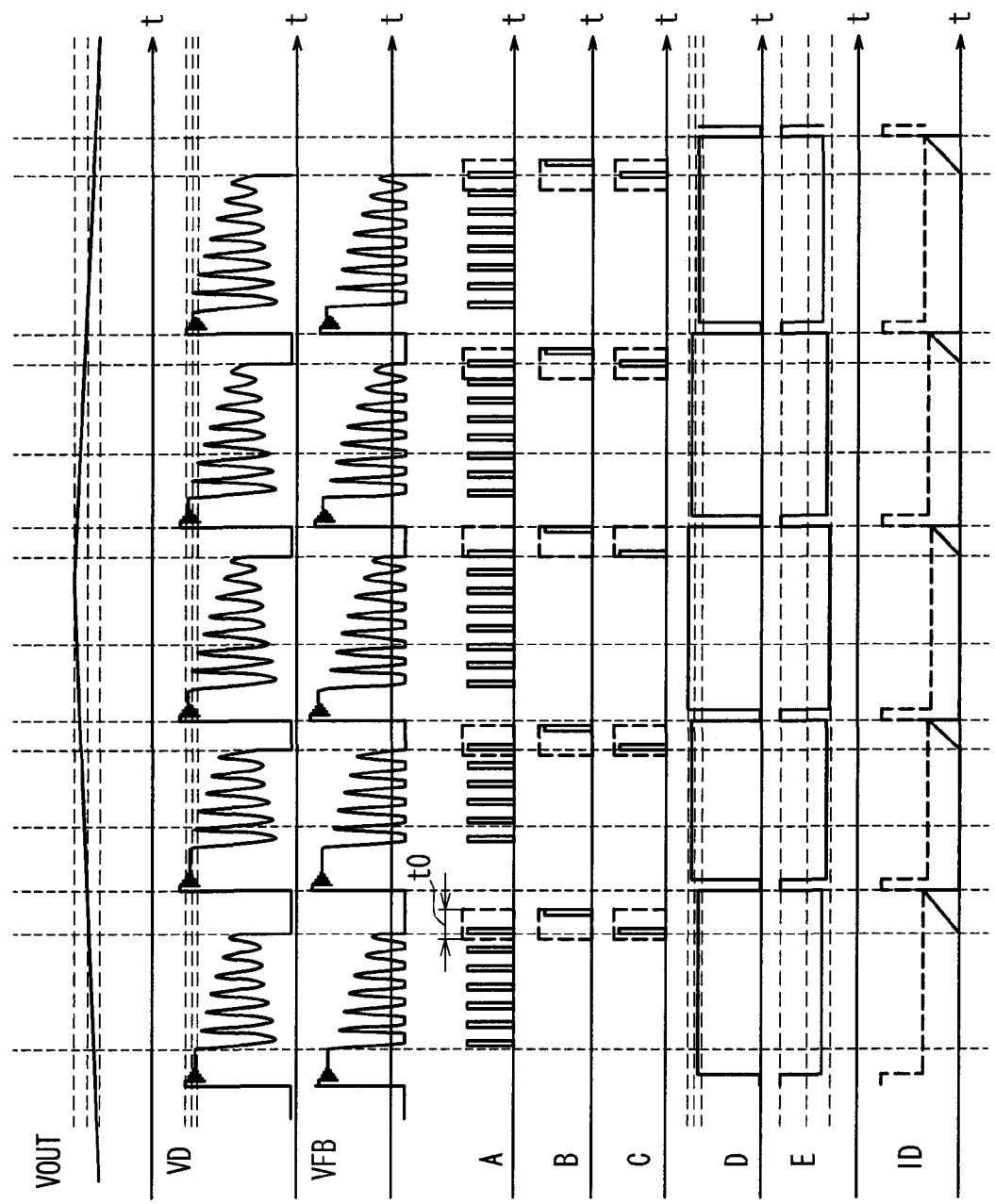
FIG. 4 shows waveforms of voltages or currents at the respective portions of the switching power supply of FIG. 2.
Figure 5:
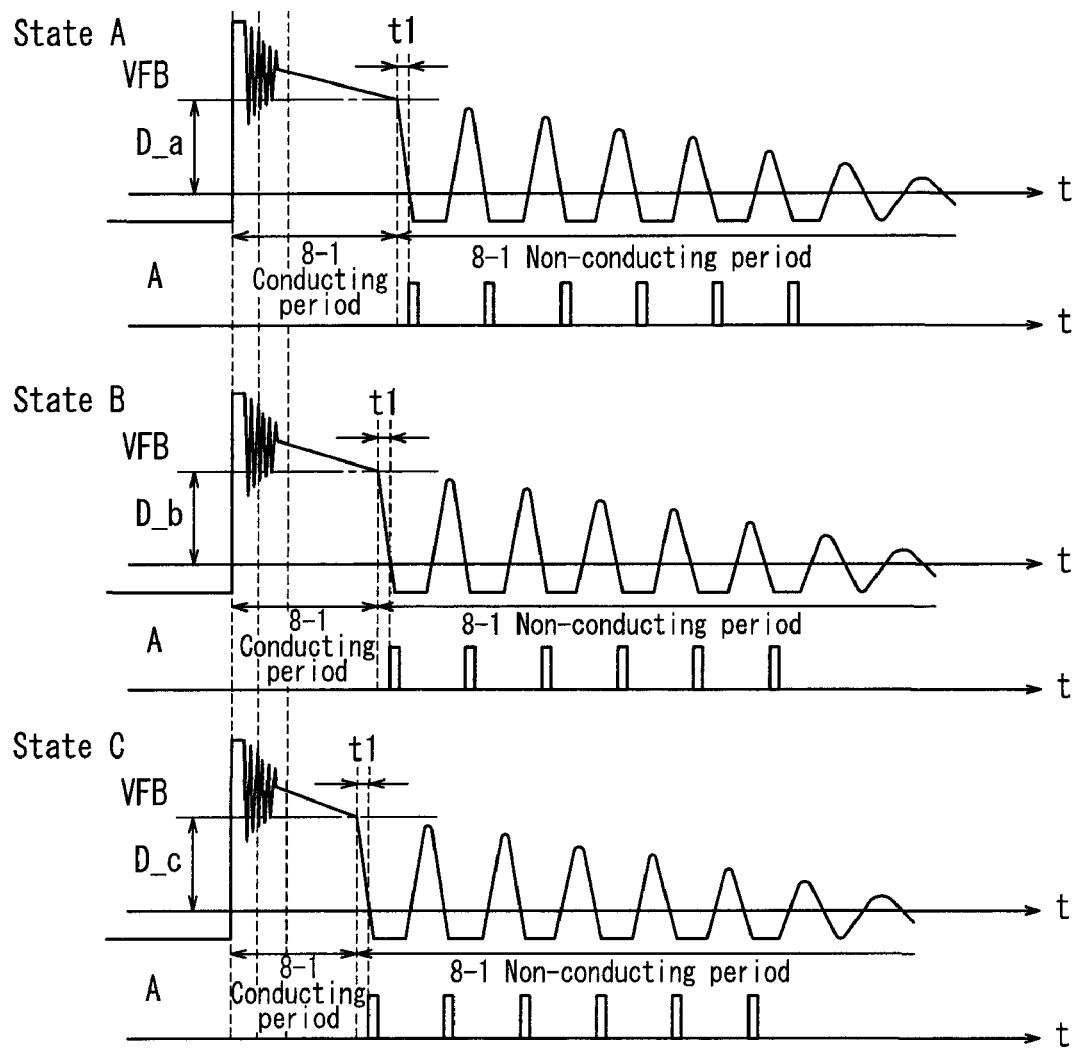
FIG. 5 shows waveforms for representing a relationship between an output voltage signal VFB of a wave-shaping circuit and an output voltage signal A of a bottom detection circuit in the switching power supply of FIG. 2.
Figure 6:
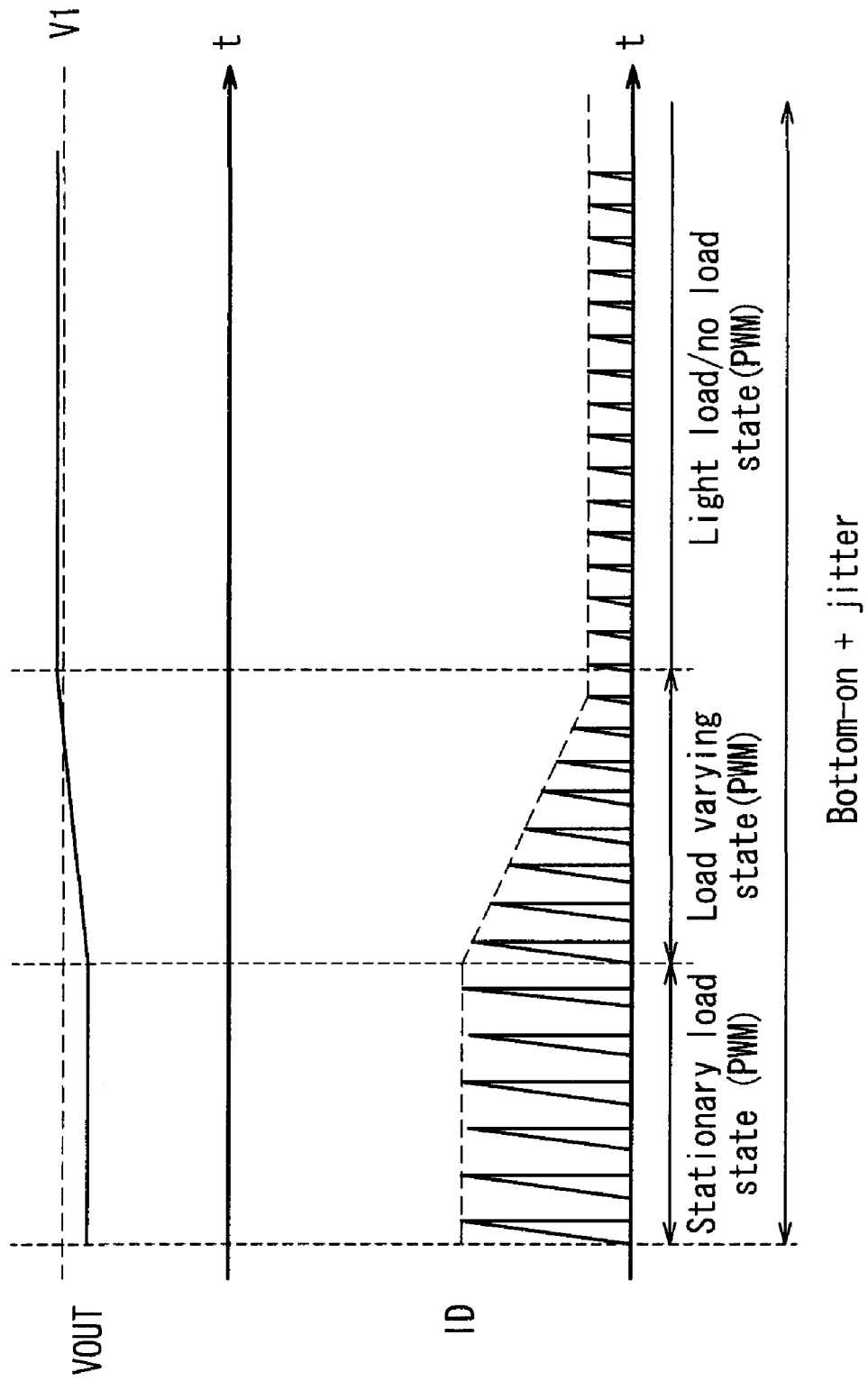
FIG. 6 shows waveforms representing a relationship between an output voltage VOUT and a drain current ID in the switching power supply of FIG. 2.

Referring now to FIGS. 4 to 6 showing waveforms, an operation by the switching power supply according to Embodiment 1 of the present invention will be explained below. FIG. 4 shows waveforms of voltages or currents at the respective portions of the switching power supply of FIG. 2. FIG. 5 shows waveforms for representing a relationship between the output voltage signal VFB of the wave-shaping circuit and the output voltage signal A of the bottom detection circuit in the switching power supply of FIG. 2. Precisely speaking, a conducting period when a current flows through the diode 8-1 is not constant but slightly different from each ON/OFF operation of the switching element 4. States A, B and C of FIG. 5 show a difference in a peak of the generated ringing caused by such different conducting periods of the diode 8-1 for better visual understanding. FIG. 6 shows waveforms representing a relationship between the output voltage VOUT and the drain current ID flowing through the switching element 4 in the switching power supply of FIG. 2.

As illustrated in the enlarged view of FIG. 5, the output voltage signal VFB of the wave-shaping circuit generates fine ringing at the beginning of a conducting period of the diode 8-1 of the rectifier/smoothing circuit 8, and thereafter decreases with a substantially constant gradient. Thereafter, during a non-conducting period of the diode 8-1, the voltage decreases to 0 V in a constant time t1 defined by a circuit constant of the rectifier/smoothing circuit, followed by ringing with a substantially constant period that is defined by the circuit constant as well. This ringing attenuates gradually.

The output voltage signal VFB of the wave-shaping circuit is input to the bottom detection circuit 22 also, where the bottom detection circuit 22 detects the situation where this VFB becomes lower than a predetermined bottom potential (0 V in the case of FIG. 5), thus detecting the bottom of the ringing and generating a bottom detection signal A.

As shown in FIG. 4, when receiving the output voltage signal VFB of the wave-shaping circuit as an input, the output voltage detection circuit 20 outputs the output voltage D that is a voltage proportional to the final VFB level at the end of the conducting period of the diode 8-1 (corresponding to D_a, D_b or D_c of FIG. 5), where the final VFB level is obtained by correcting the VFB voltage after fine ringing at the beginning of the conducting period of the diode 8-1 with the conducting time of the diode 8-1. This D_a, D_b or D_c of FIG. 5 can be obtained by holding the VFB voltage after fine ringing at the beginning of the conducting period of the diode 8-1 within the output voltage detection circuit 20 by a peak hold circuit or the like and discharging the voltage using a constant-current source over the conducting period of the diode 8-1. Meanwhile, this output signal D is reset every time the switching element 4 turns OFF from ON. For instance, in the illustrated case of FIG. 4, the switching element 4 is reset to 0V.

Assuming that the output voltage VOUT changes in accordance with the magnitude of a load applied to the OUT terminal and the RETURN terminal as shown in FIG. 4, the output signal D of the output voltage detection circuit 20 also increases and decreases correspondingly with the change of the output voltage VOUT. This output signal D of the output voltage detection circuit 20 is input to the error amplifier 21, and the signal E output from the error amplifier 21 is fed to the overcurrent detection circuit 17. Herein in the case of the present embodiment, the error amplifier 21 amplifies a potential corresponding to a difference between the voltage of the input signal D and a predetermined voltage (potential indicated by the lowermost dashed lines of the signal D of FIG. 4), and outputs the output signal E that is obtained by subtracting the amplified voltage from a predetermined potential (uppermost dashed lines of the signal E of FIG. 4). The overcurrent detection circuit 17 compares the signal E with the drain voltage VD when the switching element 4 is ON, so as to perform ON/OFF control of the switching element 4, that is, PWM control in a current mode type. In this way, the drain current ID is adjusted by the PWM control of the switching element 4, whereby the output voltage VOUT can be controlled within a predetermined range.

Switching from OFF to ON of the switching element 4 is implemented in accordance with an OR signal of a CLOCK signal B output from the oscillator 11 internal to the control circuit 3 and an output C of the SAWTOOTH signal adjustment circuit 23, that is, in accordance with an output of the OR circuit 12. The CLOCK signal B is a clock signal generated when a SAWTOOTH signal changes from a downward direction to an upward direction, and has a fixed frequency. The output C of the SAWTOOTH signal adjustment circuit 23 is generated based on a SAWTOOTH signal output from the oscillator 11 and the output signal A of the bottom detection circuit 22. As stated above, the bottom detection circuit 22 receives as an input the VFB voltage in a ringing waveform that is generated during a non-conducting period of the diode 8-1 of the rectifier/smoothing circuit 8 that is fed back to the FB terminal. The bottom detection circuit 22 compares such VFB voltage with a predetermined DC voltage to generate the output signal A and feeds the same to the SAWTOOTH signal adjustment circuit 23.

Therefore, the switching of the switching element 4 from OFF to ON is performed either at the timing when the CLOCK signal B is output or at the timing when the output signal C of the SAWTOOTH signal adjustment circuit 23 is generated during a preceding certain period (period indicted as t0 in FIG. 4), that is, at the timing when the bottom of the VFB voltage is detected. Incidentally, during the actual operation, the output signal C dominantly makes the switching element 4 turn ON.

Herein, the output signal C is a part of the output signal A of the bottom detection circuit that is generated in response to the ringing waveform of the VFB voltage generated during a non-conducting period of the diode 8-1 of the rectifier/smoothing circuit 8. As shown in FIG. 5, this output signal A is generated with a constant frequency when a predetermined time t1 has elapsed after the completion of the conducting period of the diode 8-1 of the rectifier/smoothing circuit 8. As stated above, since the conducting period of the diode 8-1 of the rectifier/smoothing circuit 8 is not completely constant, but fluctuates slightly for each ON/OFF operation of the switching element 4. Thus, the starting timing of the output signal C also changes slightly. For this reason, the period of the ON/OFF control of the switching element 4, for which this output signal C is dominant in the actual use, will change within a range obtained by adding the time width t0 to the CLOCK signal B having a fixed frequency of the oscillator 11. This can be understood easily by imaging the situation where ringing pulses in the three states A, B and C of FIG. 5 during the non-conducting period of the diode 8-1 are overlapped, where the respective ringing pulses are out of phase slightly with one another. In this way, according to the present embodiment, the timing of turning ON the switching element 4 can be dispersed within a predetermined range, and therefore as compared with the case where the switching element 4 is turned ON always at the same timing, the effect of lowering the waveform peak, i.e., a jitter effect, can be obtained without providing any special jitter circuit.

From the above, the relationship between the output voltage VOUT and the drain current ID of the switching power supply of Embodiment 1 of the present invention is as shown in FIG. 5. Herein, dashed lines of the ID waveform of FIG. 6 represent the dashed lines during an ON period of the switching element 4 of the ID waveform of FIG. 4, i.e., a peak current (value) in a current mode. That is, these dashed lines are proportional to the output signal E of the error amplifier 21, and changes with a change in a load state, i.e., a change in the output voltage VOUT.

As shown on the left side of FIG. 6, where the heaviest stationary load is applied as the load of the output circuit, the output voltage is within a rated range but is slightly smaller than the reference voltage V1 due to the influence of the load. The drain current ID at this time is subjected to the PWM control and therefore it becomes a pulse waveform in a triangle shape. The drain current ID in this state has the highest peak value. Next, assuming that the load decreases gradually, the peak value of the drain current ID also decreases as shown in the center portion of FIG. 6. Moreover, in the case where the load is considerably small or no load is applied, then the peak value of the drain current ID also becomes the lowest as shown on the right side of FIG. 6. In this way, even when the load of the output circuit changes, the bottom-on effect and the jitter effect both can be obtained in any case.

As explained above, when the switching power supply of Embodiment 1 of the present invention is used, the following effects can be obtained:

(1) The output voltage VFB of the wave-shaping circuit 7 connected with the auxiliary winding 2-3 is input to the FB terminal of the control circuit 3, so that the operation of detecting a change in the output voltage by the output voltage detection circuit 20 and the operation of switching the switching element 4 from OFF to ON by the bottom detection circuit 22 can be conducted at the same time while keeping the drain voltage VD relatively low;

(2) Thereby, there is no need to provide a circuit configuration for detecting the output voltage on the secondary side of the switching power supply, and therefore the number of components can be reduced, thus permitting the downsizing of the switching power supply. In addition, the bottom-on effect that can ensure turning ON the switching element 4 at a low voltage and the jitter effect without the requirement for a jitter circuit can be obtained, thus realizing low noise;

(3) Furthermore, the operating frequency of the switching element 4 changes only within a predetermined width, and therefore in addition to the above-stated jitter effect, the frequency can be of a constant width irrespective of the load applied to the output. Therefore, there is no need to design a switching transformer so as to handle an operating frequency over a wide range. Thus, the switching transformer can be minimized, which means the downsizing of the switching power supply as a whole. This especially is effective for a high-power switching power supply that tends to increase the size of the switching transformer;

(4) Moreover, the above-stated various effects can be obtained even in the case where the present embodiment is applied to a low-power switching power supply. Therefore, the present embodiment is not limited to a certain range of output, and can be used to various applications; and (5) In the case where the present embodiment is applied to a low-power switching power supply, it becomes easier to cope with noise, thus facilitating the design of a switching power supply.

Note here that although the present embodiment deals with the case where the CLOCK signal B of the oscillator 11 serving as the operating frequency of the switching element 4 has a fixed frequency, the present invention is not limited to this. As a possible design, the CLOCK signal B can have a frequency varying with a predetermined width having a pre-determined fixed frequency as a center. With this design, a more improved jitter effect can be obtained, thus further reducing noise.

EMBODIMENT 2

Figure 7:
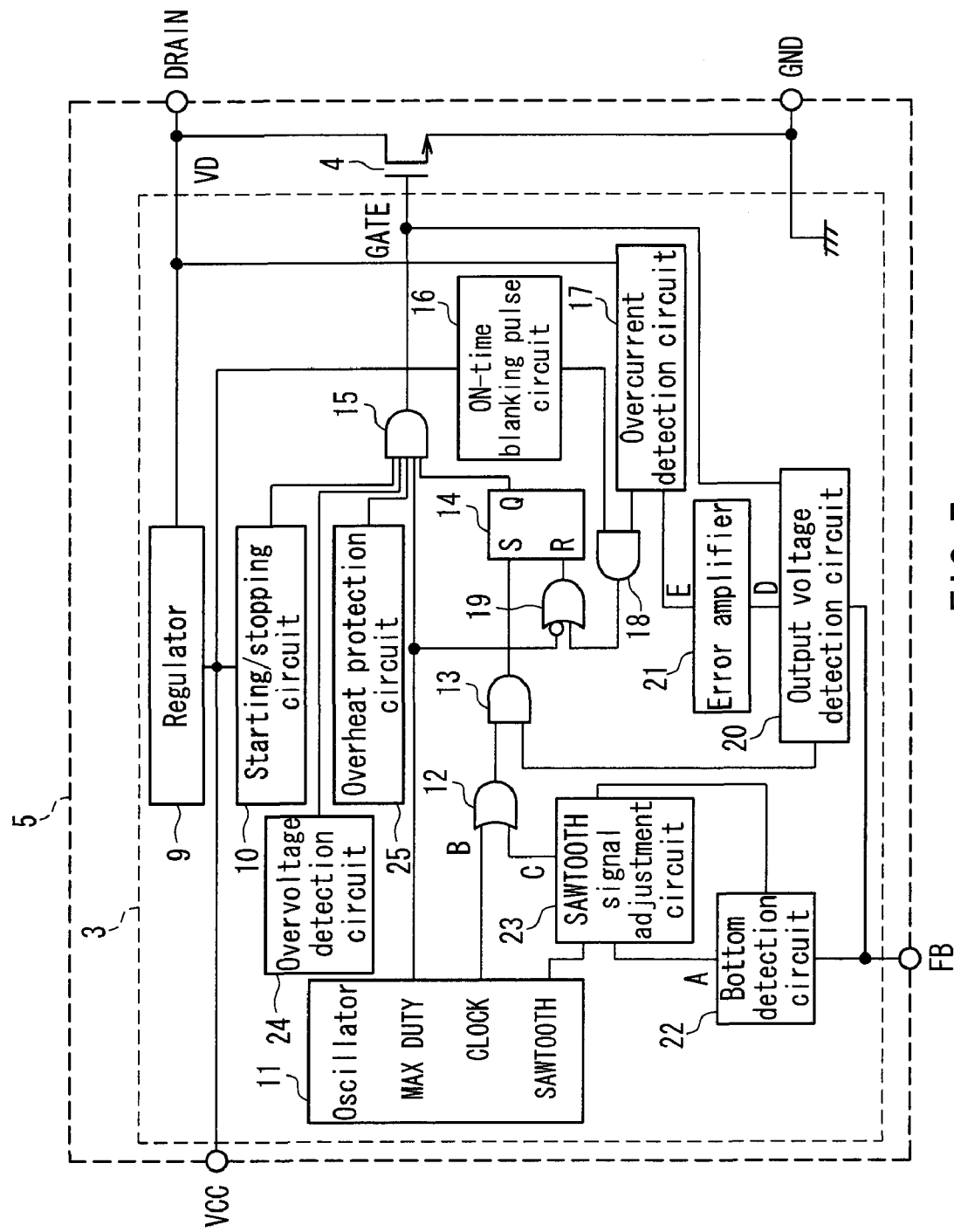
FIG. 7 is a circuit diagram of a semiconductor device used for a switching power supply according to Embodiment 2 of the present invention.

FIG. 7 is a circuit diagram of a semiconductor device used for a switching power supply according to Embodiment 2 of the present invention. The semiconductor device of the present embodiment includes an overvoltage detection circuit 24 and an overheat protection circuit 25 in addition to the semiconductor device of Embodiment 1 of FIG. 3, and the other configuration and the basic operation are the same as those of the semiconductor device of FIG. 3. Therefore, the switching power supply of the present embodiment can show the properties of the switching power supply according to Embodiment 1 of FIG. 2.

Since the switching power supply of the present embodiment additionally includes the overvoltage detection circuit 24 and the overheat protection circuit 25 in a control circuit 3 of the semiconductor device 5, the following effects can be obtained further.

The overvoltage detection circuit 24 detects the situation where an operating voltage VCC, which should be controlled to be a constant voltage by a regulator 9 internal to the control circuit 3, is increased forcibly by external power supply (e.g., application of a current), and stops or suspends the switching operation of the switching element 4 by the control circuit 3. Thereby, the safety of the switching power supply can be enhanced.

The overheat protection circuit 25 detects the situation where the switching element 4 generates heat abnormally during the switching operation, and stops or suspends the switching operation of the switching element 4. This can prevent a breakage of the switching element 4, and can enhance the safety of the switching power supply.

EMBODIMENT 3

Figure 8:
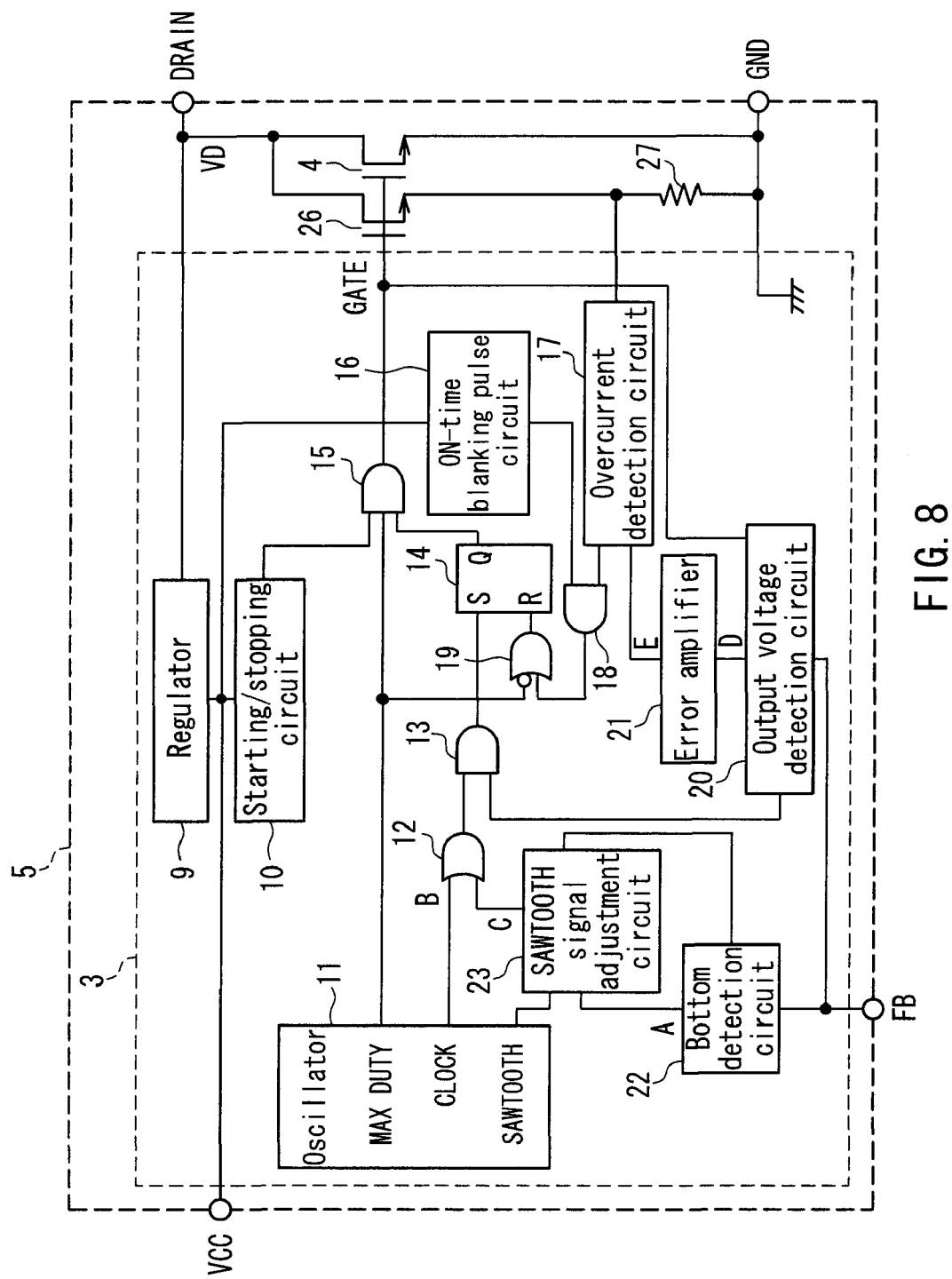
FIG. 8 is a circuit diagram of a semiconductor device used for a switching power supply according to Embodiment 3 of the present invention.

FIG. 8 is a circuit diagram of a semiconductor device used for a switching power supply according to Embodiment 3 of the present invention. The semiconductor device of the present embodiment includes a second switching element 26 and a resistor 27 in addition to the semiconductor device of Embodiment 1 of FIG. 3, and the other configuration and the basic operation are the same as those of the semiconductor device of FIG. 3. Therefore, the properties of the switching power supply according to Embodiment 1 of FIG. 2 can be obtained from the switching power supply of the present embodiment as well.

Since the switching power supply of the present embodiment additionally includes the second switching element 26 and the resistor 27, the following further effects can be obtained.

According to the semiconductor device of FIG. 3, the overcurrent detection circuit 17 detects the drain voltage VD at the time of the ON state of the switching element 4 to detect a current flowing through the switching element 4. On the other hand, the semiconductor device of the present embodiment is configured so that a current having a constant ratio to a current flowing through the switching element 4 is allowed to flow through the second switching element 26 and the resistor 27 and an overcurrent detection circuit 17 detects a voltage across the resistor 27 to detect a drain current. When a capacitor is added between drain and source of the switching element 4 in order to further reduce switching noise, for example, this configuration can enhance the design flexibility of a capacitance of such a capacitor as compared with the semiconductor device of FIG. 3. As a result, the countermeasures against noise can be widened in scope, and the flexibility of the countermeasures against noise in designing a power supply can be enhanced as well.

EMBODIMENT 4

Figure 9:
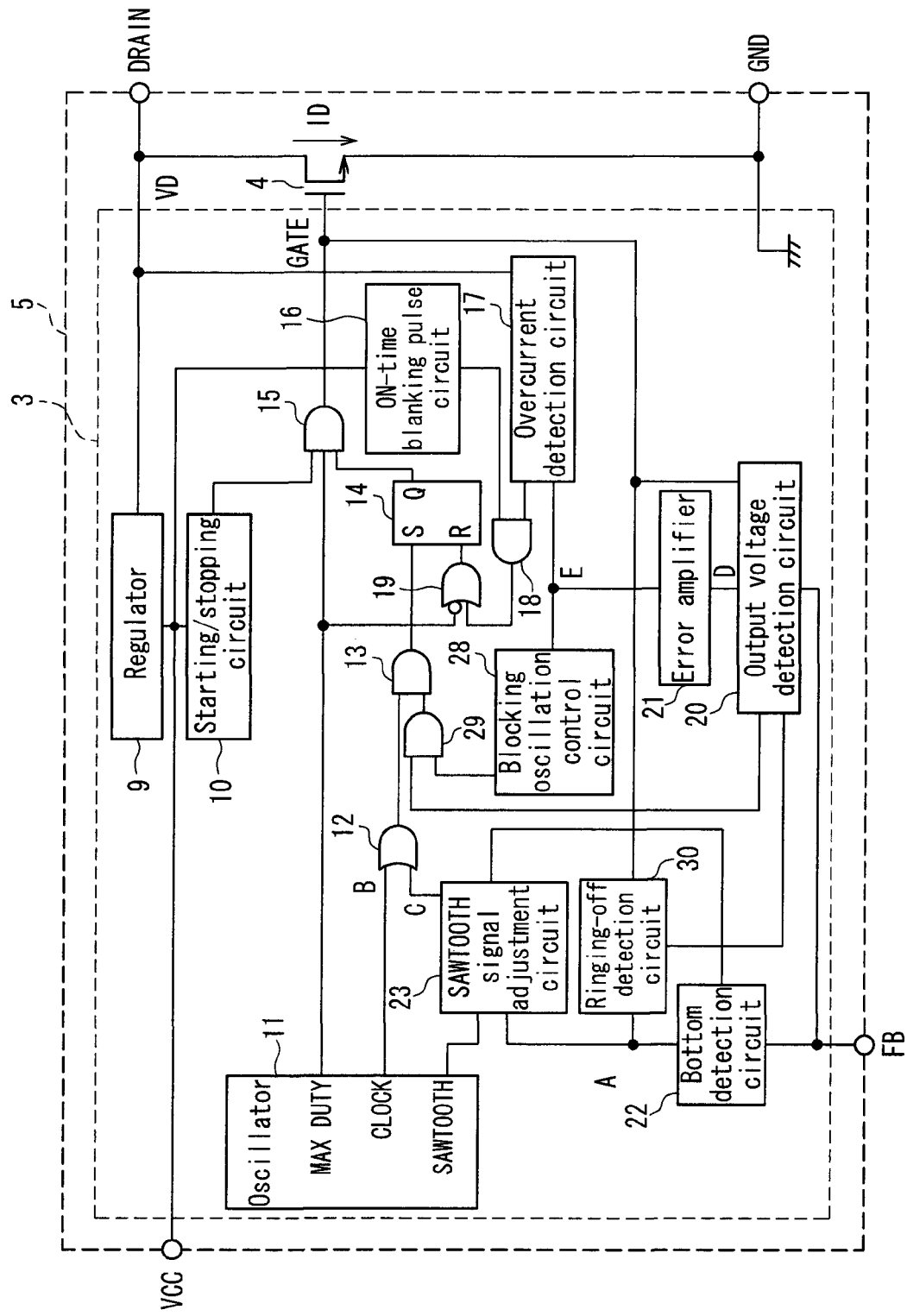
FIG. 9 is a circuit diagram of a semiconductor device used for a switching power supply according to Embodiment 4 of the present invention.

FIG. 9 is a circuit diagram of a semiconductor device used for a switching power supply according to Embodiment 4 of the present invention. The semiconductor device of the present embodiment includes a blocking oscillation control circuit 28, an AND circuit 29 and a ringing-off detection circuit 30 in addition to the semiconductor device of Embodiment 1 of FIG. 3, and the other configuration and the basic operation are the same as those of the semiconductor device of FIG. 3. Therefore, the properties of the switching power supply according to Embodiment 1 of FIG. 2 can be obtained from the switching power supply of the present embodiment as well.

Since the switching power supply of the present embodiment additionally includes the blocking oscillation control circuit 28, the AND circuit 29 and the ringing-off detection circuit 30, the following further effects can be obtained.

Figure 10:
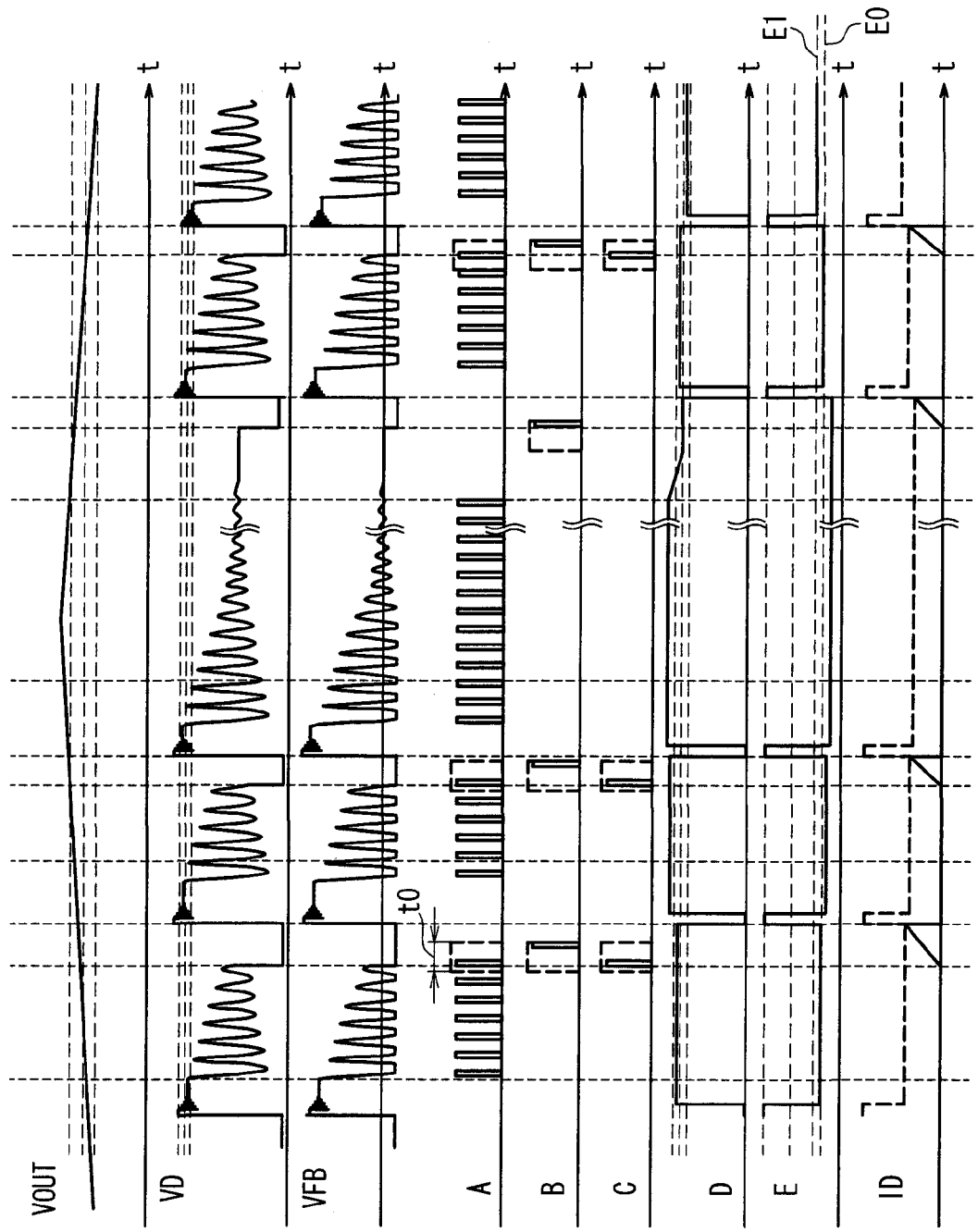
FIG. 10 shows operating waveforms at the respective points of the switching power supply according to Embodiment 4 of the present invention.

FIG. 10 shows operating waveforms at the respective points of the switching power supply according to Embodiment 4 of the present invention. The way of representing the respective waveforms is similar to that in FIG. 4 referred to in Embodiment 1.

Hereinafter, it is assumed that the output voltage VOUT changes as shown in FIG. 10. At this time, when the load connected with an output terminal becomes a low load or in the case of no load, that is, when the level of an output signal E of an error amplifier 21 becomes lower than the level E0 of FIG. 10, the blocking oscillation control circuit 28 outputs a signal to the AND circuit 29 so as to stop or suspend the switching operation of a switching element 4. When the switching operation of the switching element 4 is stopped or suspended, the ringing-off detection circuit 30 functions to monitor a state of the load applied to the output terminal. Then, if a bottom detection circuit 22 does not output an output signal A, the ringing-off detection circuit 30 forcibly turns OFF an output signal D of an output voltage detection circuit 20. Thereby, the switching operation of the switching element 4 is resumed, and blocking oscillation control is performed so as to detect the output voltage VOUT.

Figure 11:
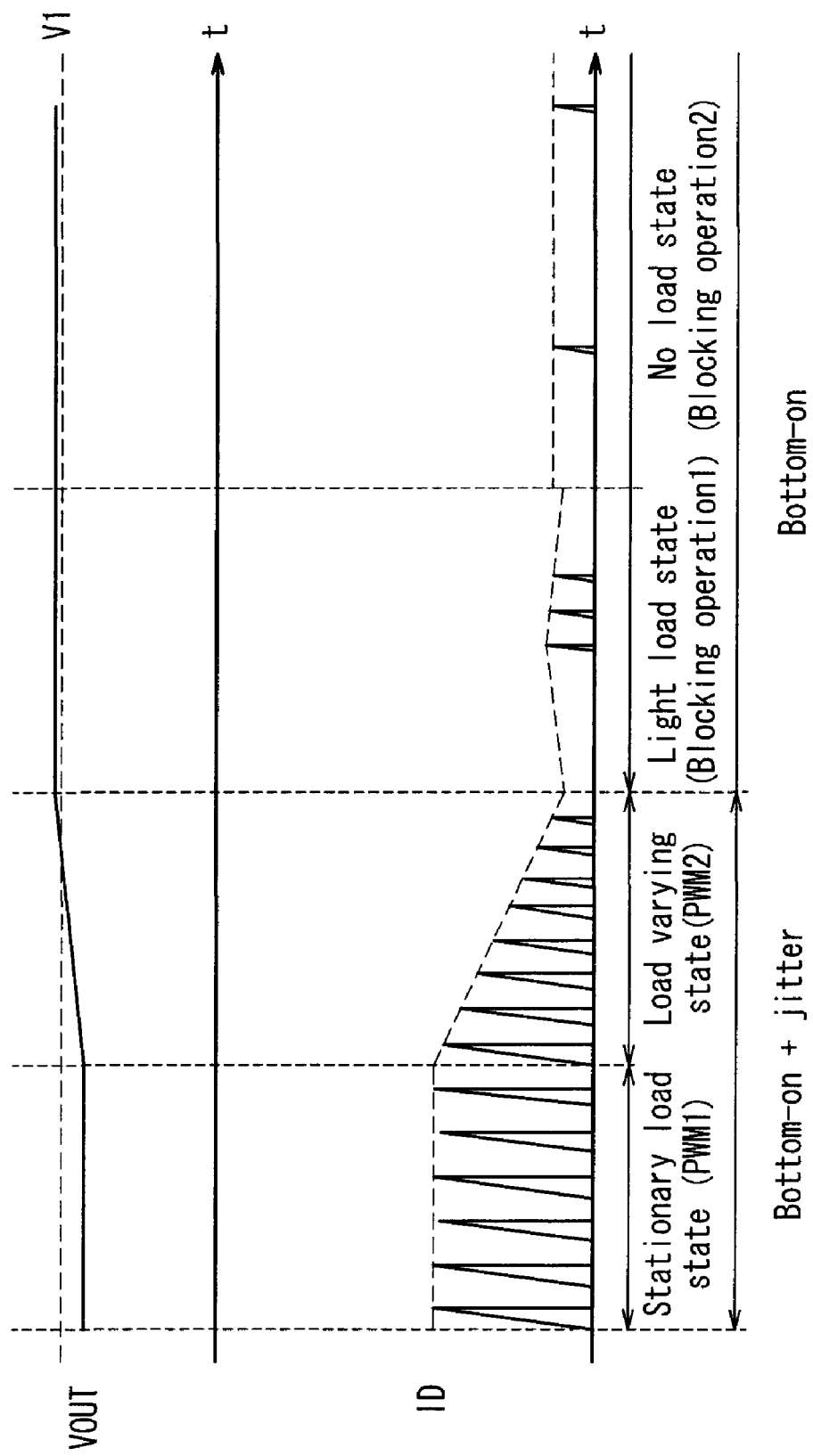
FIG. 11 shows a relationship between an output voltage VOUT and a drain current ID in the switching power supply according to Embodiment 4 of the present invention.

FIG. 11 shows the relationship between the output voltage VOUT and a drain current ID of the switching power supply according to Embodiment 4 of the present invention. According to the above-stated operation, the output voltage VOUT and the input current ID change as shown in FIG. 11. As is easily understood from the comparison with FIG. 6 showing the respective waveforms in Embodiment 1, in a stationary load state with the heaviest load (shown as PWM1 in this drawing) and a load varying state (PWM2) where the load is decreased gradually, the drain current ID is similar to that shown in FIG. 6.

Then, when the load becomes lighter to be a light load state (shown as blocking operation 1), the drain ID is in a blocking pulse state. Furthermore, when the load becomes a no-load state, the number of pulses becomes minimum. In this state, a peak value of the drain current ID shown with the dashed lines in the drawing becomes the lowest as compared with the heavy load state similarly to FIG. 6.

In this way, according to the present embodiment, in the stationary load state and the varying load state having a relatively heavy load, both of the bottom-on effect and the jitter effect as described above can be obtained, whereas in the light load state and the no load state, the bottom-on effect can be obtained. Thus, the switching power supply of the present embodiment especially can realize a high efficiency of the switching power supply in the light load or no load state.

Note here that in the case where the output voltage is detected when the switching operation of the switching element 4 is stopped or suspended, the reduction level of the output signal D may be set so as to minimize an ON duty of the switching element 4 in order to reduce the switching loss as possible, when the switching operation is resumed. Thereby a still higher efficiency of the switching power supply can be realized in the light load or no load state.

EMBODIMENT 5

Figure 12:
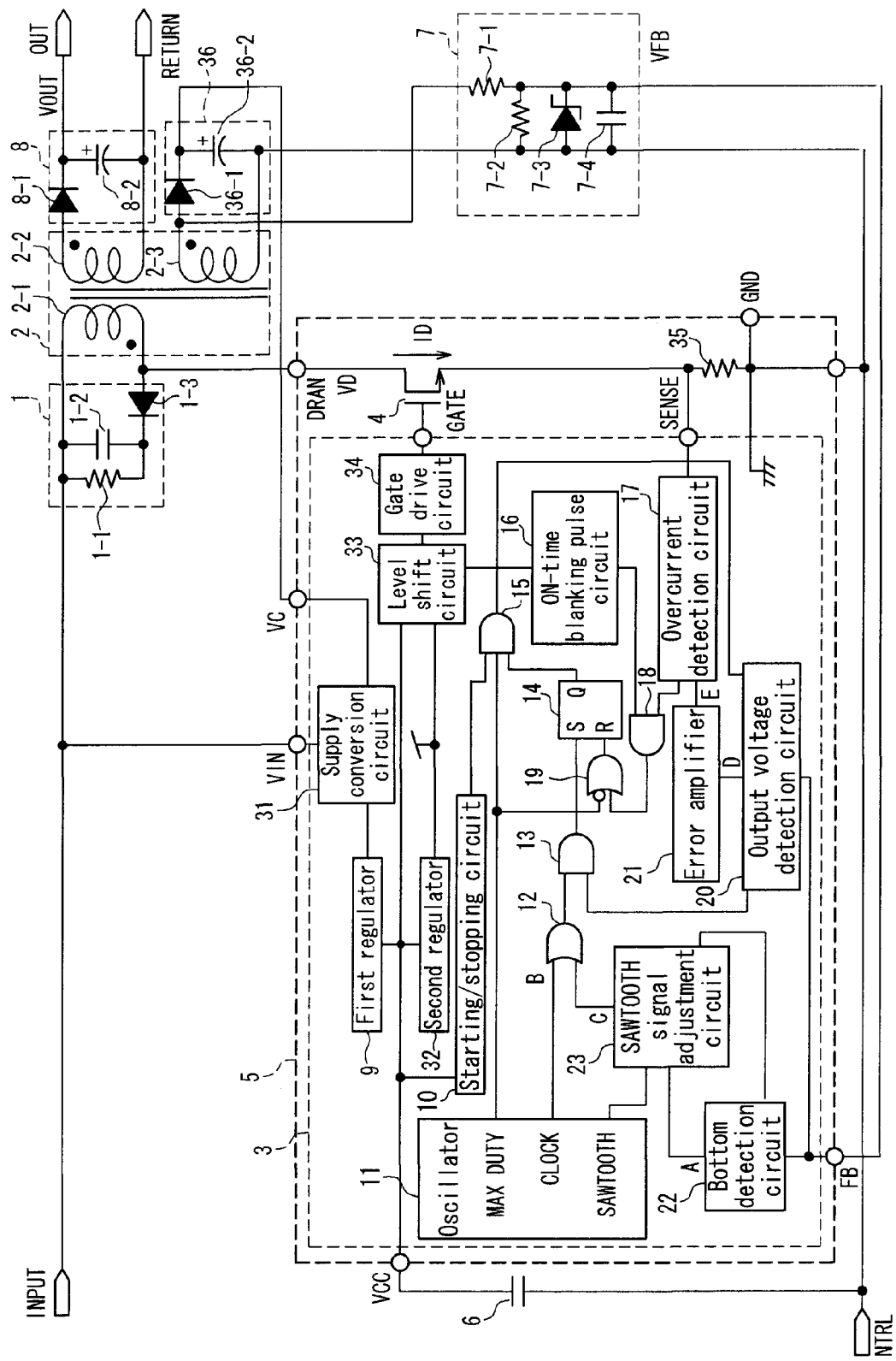
FIG. 12 is a circuit diagram of a switching power supply according to Embodiment 5 of the present invention.
Figure 13:
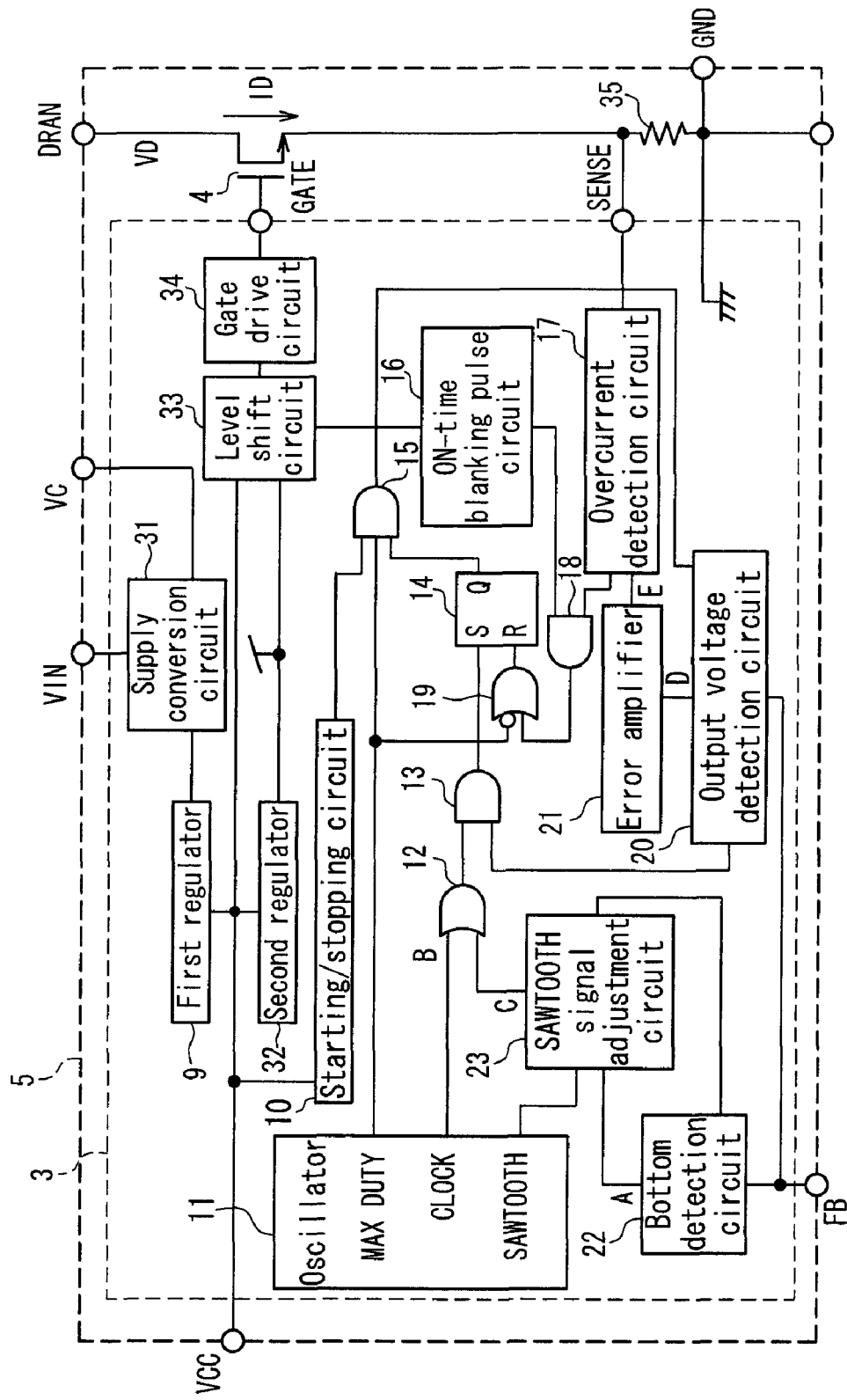
FIG. 13 is a circuit diagram of a semiconductor device used for the switching power supply according to Embodiment 5 of the present invention.

FIG. 12 is a circuit diagram of a switching power supply according to Embodiment 5 of the present invention. FIG. 13 is a circuit diagram of a semiconductor device used for the switching power supply according to Embodiment 5 of the present invention. The semiconductor device of the present embodiment includes a supply conversion circuit 31, a second regulator 32, a level shift circuit 33, a gate drive circuit 34 and a resistor 35 in addition to the semiconductor device of FIG. 3. The switching power supply of the present embodiment adopts the semiconductor device 5 of FIG. 13 in the switching power supply of FIG. 2, and additionally includes an auxiliary winding voltage rectifier/smoothing circuit 36.

The semiconductor device of the present embodiment is suitable for a switching element 4 dealing with a high power, such as an element having a high threshold voltage of a gate, i.e., suitable for the use in a high-power switching power supply. This semiconductor device has a configuration capable of separating operating voltages for a major circuit inside the control circuit 3 from a driving voltage for ON/OFF control of a gate of the switching element 4.

In FIG. 12, a DC voltage (e.g., a voltage obtained by rectifying an AC power supply voltage and smoothing it) is supplied between an INPUT terminal and a NTRL terminal, i.e., at both ends of a primary winding 2-1 of a switching transformer 2 and a switching element 4 that are connected in series. When the voltage is input between the INPUT-NTRL terminals, a charge current is supplied to a capacitor 6 from a VIN terminal connected with INPUT and the other terminal of the primary winding 2-1 of the switching transformer 2 via the supply conversion circuit 31 and a regulator 9, and the voltage across the capacitor 6 rises gradually. Along with the rise of the voltage VCC across the capacitor 6, the operating voltages of the major circuit inside the control circuit 3 also rise gradually via the second regulator 32.

The control circuit 3 operates by the voltage across the capacitor 6 as a power supply voltage, and performs ON/OFF control of the switching element 4 within a range of a starting voltage and a stopping voltage defined by a starting/stopping circuit 10 internal to the control circuit 3. The operating voltages of the major circuit inside the control circuit 3 are controlled to be constant by the second regulator 32. Upon starting of the ON/OFF control of the switching element 4 by the control circuit 3, electric power is conveyed from the primary winding 2-1 to a secondary winding 2-2 and an auxiliary winding 2-3 of the switching transformer 2. A voltage generated at the secondary winding 2-2 of the switching transformer 2 is rectified by a diode 8-1 of a rectifier/smoothing circuit 8 and smoothed by a capacitor 8-2 of the same to be an output voltage VOUT. This output voltage VOUT is output as a voltage between an OUT terminal and a RETURN terminal. The output voltage VOUT is detected by an output voltage detection circuit 20 internal to the control circuit 3 from an output voltage signal VFB of a wave-shaping circuit 7 connected with the auxiliary winding 2-3 of the switching transformer 2.

The auxiliary winding voltage rectifier/smoothing circuit 36 including a diode 36-1 and a capacitor 36-2 is connected with the auxiliary winding 2-3, so that a voltage generated at the auxiliary winding 2-3 is rectified by the diode 36-1 and smoothed by the capacitor 36-2 to be a DC voltage. This DC voltage is supplied to the supply conversion circuit 31 from a VC terminal of the control circuit 3. Before starting the switching operation of the switching element 4 by the control circuit 3, the supply conversion circuit 31 supplies electric power to the control circuit 3 through the VIN terminal, and after the start of the switching operation, the supply conversion circuit 31 performs switching control such that the electric power is supplied to the control circuit 3 through the VC terminal. A current flowing through the switching element 4 in an ON state is detected by detecting a voltage across the resistor 35 connected in series with the switching element 4.

Thereby, even in the case of a switching element 4 dealing with a high power, the same properties as in the switching power supply of FIG. 2 can be obtained, and therefore a switching power supply handling a low power to a high power can be achieved.

Furthermore, according to the semiconductor device 5 of the present embodiment, the operating voltage of the control circuit 3 after the start of the switching operation of the switching element 4 is supplied from the output voltage of the auxiliary winding voltage rectifier/smoothing circuit 36 that is connected with the auxiliary winding 2-3 at a voltage lower than a voltage of the INPUT terminal, and therefore the power supply efficiency of the switching power supply can be enhanced. Also in the semiconductor devices of the above-stated Embodiments 1 to 4, the VIN terminal, the VC terminal and the supply conversion circuit 31 may be connected additionally upstream of the regulator 9, resulting in a circuit configuration similar to the semiconductor device of the present embodiment, whereby the similar properties can be obtained.

Incidentally, each of the semiconductor devices 5 according to the embodiments illustrated in FIGS. 3, 7, 8 and 9 may be incorporated into one semiconductor package (irrespective of the number of internal semiconductor chips) as described above, whereby the downsizing of the switching power supply can be achieved.

As stated above, the present invention is applicable to a switching power supply or various electronic equipment including a switching power supply built therein. The present invention especially is useful for a compact electrical apparatus requiring downsizing as well as lower noise.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A switching power supply, comprising:
   a switching transformer including a primary winding, a secondary winding and an auxiliary winding;
   a switching element connected in series with the primary winding of the switching transformer;
   a rectifier/smoothing circuit connected with the secondary winding of the switching transformer;
   a wave-shaping circuit connected with the auxiliary winding of the switching transformer; and
   a control circuit that controls ON/OFF of the switching element,
   wherein the control circuit comprises:
   an output voltage detection circuit that generates, from a feedback voltage output from the wave-shaping circuit, a signal for PWM control of the switching element; and
   a bottom detection circuit that detects, from the feedback voltage, a bottom level of a ringing voltage during a duration of a time when a current does not flow through the secondary winding of the switching transformer,
   wherein the control circuit switches the switching element from OFF to ON in accordance with a signal output from an oscillator internal to the control circuit or a signal output from the bottom detection circuit.

2. The switching power supply according to claim 1, wherein an operating voltage of the control circuit is supplied from a connection node between one terminal of the primary winding of the switching transformer and the switching element or from the other terminal of the primary winding.

3. The switching power supply according to claim 1, wherein the control circuit further comprises:
   an error amplifier that amplifies a signal output from the output voltage detection circuit; and
   an overcurrent detection circuit to which an output from the error amplifier is fed.

4. The switching power supply according to claim 3, wherein the control circuit further comprises a blocking oscillation control circuit that stops or suspends an ON/OFF operation of the switching element if an output signal level of the error amplifier is a predetermined value or lower.

5. The switching power supply according to claim 4, wherein the control circuit further comprises a ringing-off detection circuit that detects a state of ringing from a voltage output from the bottom detection circuit, and when the ringing-off detection circuit detects that ringing disappears, the control circuit resumes ON/OFF control of the switching element.

6. The switching power supply according to claim 1, wherein an oscillation frequency of the oscillator internal to the control circuit has a predetermined width with a fixed frequency as a center.

7. The switching power supply according to claim 1, wherein the control circuit further comprises an overvoltage detection circuit that detects when the operating voltage is higher than a predetermined voltage.

8. The switching power supply according to claim 1, wherein the control circuit further comprises an overheat protection circuit.

9. The switching power supply according to claim 1, wherein the wave-shaping circuit comprises a Schottky barrier diode.

10. The switching power supply according to claim 1, further comprising an auxiliary winding voltage rectifier/smoothing circuit connected with the auxiliary winding, wherein electric power is supplied to the control circuit from the auxiliary winding voltage rectifier/smoothing circuit.

11. A semiconductor device used for the switching power supply according to claim 1, wherein the switching element and the control circuit are integrated on a single substrate or are incorporated into a single package.

* * * * *